Sept. 4, 1956 D. S. ROBBINS 2,761,189
SHACKLE TYPE THIMBLE AND METHOD OF MAKING THE SAME
Filed Nov. 8, 1951

INVENTOR:
DAVID S. ROBBINS,
BY: Donald G. Dalton
his Attorney.

United States Patent Office 2,761,189
Patented Sept. 4, 1956

2,761,189

SHACKLE TYPE THIMBLE AND METHOD OF MAKING THE SAME

David S. Robbins, Hamden, Conn., assignor to United States Steel Corporation, a corporation of New Jersey Application November 8, 1951, Serial No. 255,513

4 Claims. (Cl. 24—123)

This invention relates to a shackle type thimble. Such fittings are usually made by casting and while cast fittings are satisfactory in many respects, they are expensive to make. The thimble is of such shape that prior to my invention it was thought that it could not be made in any other manner and for that reason such thimbles in general use have been cast even in spite of the drawbacks thereof.

It is an object of my invention to provide a forged shackle type thimble.

Another object is to provide a method of making a forged shackle type thimble.

This and other objects will be more apparent after referring to the following description and attached drawings in which.

Figure 1:
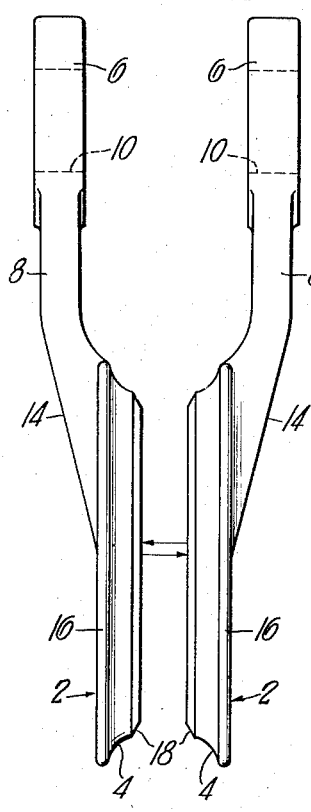
Figure 1 is a view showing the two parts of the fitting prior to their assembly.
Figure 2:
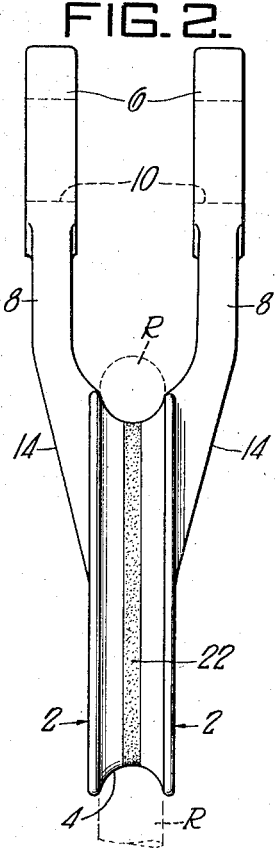
Figure 2 is a view, similar to Figure 1, showing the completed fitting.
Figure 3:
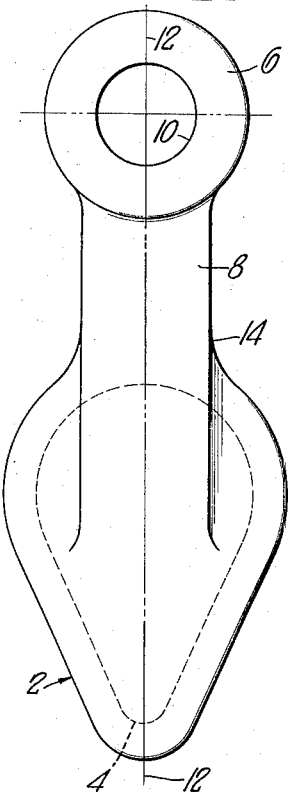
Figure 3 is a side view of the fitting.

Referring more particularly to the drawings, reference numeral 2 indicates the thimble portion of the fitting. The thimble portion has a substantially semi-circular annular groove 4 around the periphery thereof for receiving a rope R. Extending from the thimble portion 2 is a shackle portion 6 which consists of two spaced apart arms 8. Each of the arms 8 has a hole 10 therein adjacent its outer end. The axes of the holes 10 are in alignment and in a plane at right angles to a plane through the bottom of the groove 4. The fitting is preferably symmetrical about the axis 12—12.

In making the thimble two identical forgings 14 are first formed. It is preferred to make the forgings of steel of the following analysis: carbon .10% to .35%; manganese .30% to .90%; silicon .15% to .30% with the remainder being substantially iron and the usual impurities. The analysis generally used within this broad range is carbon .20% to .35%; manganese .60% to .70%; and silicon .15% to .30%. A particular analysis which has been successfully used as carbon .31%; manganese .86%; and silicon .25%.

Figure 4:
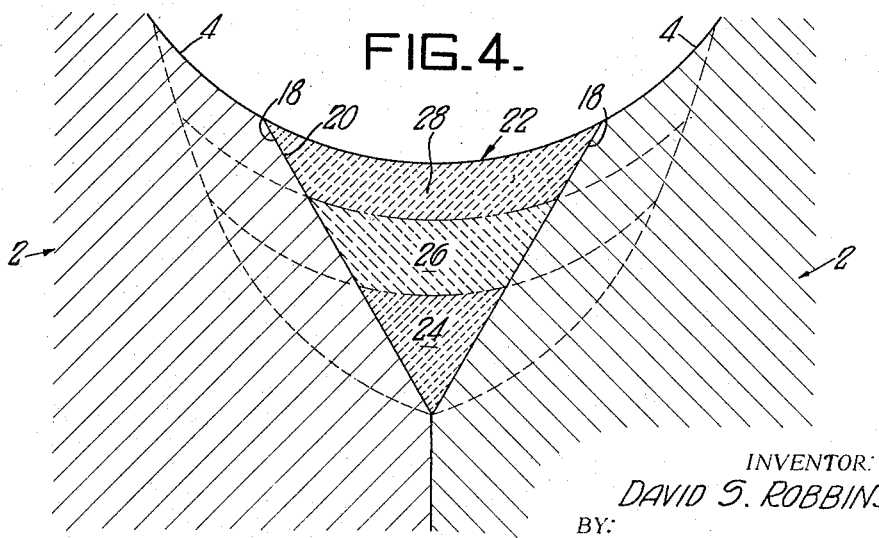
Figure 4 is an enlarged sectional view through the weld connecting the two parts of the fitting.

Each forging 14 includes one of the arms 8 and a half thimble portion 16. The half thimble portion 16 is beveled at 18 for a purpose which will appear later. In case the fitting is not symmetrical about the axis 12—12, it will be necessary for the forgings to be made right and left hand rather than identical. The two forgings 14 are placed together with their beveled portions 18 in contact thus forming an annular triangular groove or recess 20, which is then filled with weld metal 22 to hold the two parts together. If the weld material 22 extends above the desired contour of the groove 4, the excess metal may be cut or ground off. As shown in Figure 4, three noticeable zones 24, 26 and 28 are formed in the weld and in the metal adjacent the weld.

In the particular example given the metal in zone 24 is approximately 50% free ferrite and 50% fine pearlite, the metal in zone 26 is approximately 95% free ferrite with small patches of carbide between the ferrite grains, and the metal in zone 28 is approximately 70% free ferrite and 30% fine pearlite. The metal in the forged structure is approximately 60% free ferrite and 40% coarse pearlite.

The grains of the metal in zone 28 have a needle-like form, this being accentuated toward the outer surface of this zone which lies in the bottom of the groove of the thimble. The metal in zone 26, due to the annealing effect of the welding operation, has a fine grain structure of approximately 1700 grains per square inch measured at 100 magnifications and the metal in zone 24 has a grain structure of approximately 450 grains per square inch measured at 100 magnifications. The metal of the forged portions of the thimble which was worked well over the critical temperature has approximately 4 grains per square inch measured at the same magnification. This grain size of the forged piece may preferably be made somewhat finer depending upon the manner and time used in forging the parts, but in any event is considerably coarser than the grains in the adjacent weld structure.

The Rockwell "B" hardness of the metal in zones 24, 26 and 28 are 97, 87 and 94, respectively, and the Rockwell "B" hardness of the metal in the forged portions is 85.

Thus a forged and welded thimble is provided with the weld portion having desirable proportions of free ferrite and fine pearlite comparable to the proportions of these in the forged portions and a greater surface hardness than the body portion which is of somewhat more ductile material. The hard surface of the weld gives better wear at the bottom of the groove 4.

The construction of the thimble is such that most of the load thereon is in the direction in which the rope extends from the fitting so that there is no danger of the fitting breaking at the weld. It has been found that the fitting is strong, wear resistant and is easily and inexpensively made. The completed fitting may be heat treated to further strengthen it.

While one embodiment of my invention has been shown and described it will be apparent that other adaptations and modifications may be made without departing from the scope of the following claims.

I claim:

1. A two-piece forged steel rope fitting comprising a thimble portion having an annular rope groove therein of arcuate cross section, a shackle type end fitting and an annular weld steel portion forming the bottom of the said groove, each of said pieces including one-half of said groove in cross-section and the entire periphery thereof, the juxtaposed surfaces of the said pieces being in direct contact with each other at the thimble portions, said weld steel portion forming a wearing surface at the bottom of said groove around its entire periphery and connecting said pieces, the surface of said weld being smooth and a continuation of the surface of the groove, the surface of the weld being harder than the remaining surface of the groove.

2. A two-piece forged steel rope fitting according to claim 1 having two spaced apart arms attached to said thimble portion, each of said arms having an opening therein, the axes of said openings being in alignment and in a plane perpendicular to a plane through the bottom of said groove, each of said pieces including one of said arms.

3. A two-piece forged steel rope fitting according to claim 1 in which the steel contains from .10% to .35% carbon, from .30% to .90% manganese, from .15% to .30% silicon and the balance substantially iron plus small amounts of usual steel constituents.

4. A two-piece rope fitting formed of forged steel containing from .20% to .35% carbon, from .60% to .90% manganese, from .15% to .30% silicon and the balance substantially iron plus small amounts of usual steel constituents, said fitting comprising a thimble portion having an annular rope groove, a shackle type end fitting and an annular weld steel portion in the bottom of the said groove, the juxtaposed surfaces of said pieces being in direct contact with each other at the thimble portions, the said weld steel portion forming the bottom of said groove and connecting said pieces, said thimble and end fitting having a micro-structure comprised of about 60% free ferrite and 40% coarse pearlite having approximately 4 grains per square inch measured by the standard A. S. T. M. chart at one hundred magnifications, said annular weld steel portion having a micro-structure varying from grains of needle-like form and approximately 30% fine pearlite and 70% free ferrite adjacent the surface of the groove bottom to grains of about 95% free ferrite with small patches of carbide between the ferrite in the central zone and substantially equal amounts of free ferrite and fine pearlite in the zone thereof most remote from the bottom of the groove, the bottom of the said groove at the weld having a hardness providing a resistance to abrasion exceeding that of the remainder of the groove by about 10%.

References Cited in the file of this patent

UNITED STATES PATENTS

| | | |
|---|---|---|
| 1,185,656 | Greenwood | June 6, 1916 |
| 1,269,507 | Proctor | June 11, 1918 |
| 1,700,991 | Wintercorn | Feb. 5, 1929 |
| 1,774,167 | Bouche | Aug. 26, 1930 |
| 1,920,927 | Nourse | Aug. 1, 1933 |
| 2,047,633 | Jacobus | July 14, 1936 |
| 2,054,939 | Larson | Sept. 22, 1936 |
| 2,180,866 | Cryer | Nov. 21, 1939 |
| 2,233,455 | Larson | Mar. 4, 1941 |
| 2,381,193 | Vaszin | Aug. 7, 1945 |
| 2,473,363 | Cook | June 14, 1949 |

FOREIGN PATENTS

| | | |
|---|---|---|
| 122,820 | Great Britain | July 31, 1919 |